United States Patent [19]

Schwartz et al.

[11] Patent Number: 5,062,894
[45] Date of Patent: Nov. 5, 1991

[54] POLY (ALKYLENE OXIDE)-MODIFIED DIARYLIDE PIGMENT COMPOSITION

[75] Inventors: Russell J. Schwartz, Cincinnati; Anthony C. Zwirgzdas, Butler; Terence R. Chamberlain, Cincinnati, all of Ohio

[73] Assignee: Sun Chemical Corporation, Fort Lee, N.J.

[21] Appl. No.: 720,310

[22] Filed: Jun. 25, 1991

Related U.S. Application Data

[63] Continuation-in-part of Ser. No. 654,162, Feb. 12, 1991.

[51] Int. Cl.$^5$ .................... C09B 31/11; C09D 11/00
[52] U.S. Cl. ........................ 106/23; 106/20; 106/493; 106/494; 106/496; 106/22; 534/729; 534/748; 534/561
[58] Field of Search ............... 106/22, 23, 493, 494, 106/496; 534/729, 748, 561

[56] References Cited

U.S. PATENT DOCUMENTS

| | | | |
|---|---|---|---|
| 3,607,861 | 9/1971 | Brown et al. | 260/176 |
| 3,655,641 | 4/1972 | Hamilton | 260/176 |
| 3,905,825 | 9/1975 | Gaetani | 106/308 N |
| 4,220,473 | 9/1980 | Robertson | 106/23 |
| 4,462,833 | 7/1984 | Hays | 106/23 |
| 4,515,639 | 5/1985 | Dopfer | 106/288 |
| 4,643,770 | 2/1987 | Hays | 106/23 |
| 4,946,509 | 8/1990 | Schwartz et al. | 106/496 |

OTHER PUBLICATIONS

Herbst et al, "Pigmenting Problems of Yellow Illustration Gravure Printing Inks" Defazet (30) 11, pp. 486–490, 1976.

"Pigment Developments" *Ink & Print*, vol. 2, pp. 16–18, 6/84.

*Primary Examiner*—William R. Dixon, Jr.
*Assistant Examiner*—Scott L. Hertzog
*Attorney, Agent, or Firm*—Jack Matalon

[57] ABSTRACT

Diarylide pigment compositions useful for preparing storage stable printing inks (especially of the publication gravure type) are prepared using a poly (alkylene oxide) substituted acetoacetanilide together with a typical acetoacetanilide and coupling the mixture of acetoacetanilides with tetrazotized dichlorobenzidine.

19 Claims, No Drawings

POLY (ALKYLENE OXIDE)-MODIFIED DIARYLIDE PIGMENT COMPOSITION

This is a continuation-in-part of copending application Ser. No. 654,162, filed on Feb. 12, 1991.

FIELD OF THE INVENTION

This invention relates to diarylide pigment compositions and to printing inks (especially of the publication gravure type) prepared from such pigment compositions. The pigment compositions are unique in that printing inks prepared therefrom are storage stable. The pigment compositions are prepared using a poly (alkylene oxide) substituted acetoacetanilide together with a typical acetoacetanilide and coupling the mixture of acetoacetanilides with tetrazotized dichlorobenzidine.

BACKGROUND OF THE INVENTION

Diarylide pigments represent an important class of coloring agents used primarily for the manufacture of printing inks. Pigment Yellow 12 is the most widely used member of this group for solvent-based publication gravure printing inks. The almost-exclusive use of P.Y. 12 for the production of solvent-based publication gravure printing inks is due not only to its economic value, but also to its susceptibility to various surface treatments which impart certain desirable application properties.

A typical surface treatment agent for diarylide pigments is an amine. British Patent 1,085,835 teaches that fatty primary amines may be used to treat Pigment Yellow 12 so as to result in a pigment allegedly having increased tinctorial strength, gloss, transparency, and reduced rheology. U.S. Pat. No. 4,515,639 describes the use of diamines to treat diarylide pigments so as to reduce the penetration of inks prepared therefrom into lower quality uncoated paper stock. There are numerous other patents which describe the use of amine treatments to achieve an improved Pigment Yellow 12 for the preparation of publication gravure printing inks, e.g. U.S. Pat. Nos. 4,463,770; 4,462,833; 4,220,473; 3,905,825; 3,827,902., 3,655,641; and 3,607,861.

Amine-treated pigments possess a major deficiency. The commercially-important types of publication gravure printing inks prepared from such treated pigments exhibit poor storage stability. This instability is manifested by a red-to-green shift in hue, and also by an increase in viscosity, cf. "Pigmentation Problems of Yellow Publication Gravure Inks", Defazet 30(11), pp.486-90, 1976; "Pigment Developments", *Ink & Print* Vol.2, pp. 16–18, June 1984. The shift in chroma causes poor color matching unless it is detected, in which case additional color adjustments must then be made at considerable cost. The increase in viscosity results in a substantial loss of strength due to the use of additional solvent which is required to adjust the ink to print viscosity. Since additional ink base must be utilized to obtain the desired print strength, a significant economic penalty results.

The magnitude of the storage instability problem varies based on a number of factors, including the type of ink vehicle utilized, the type of dispersion equipment utilized to prepare the ink, the ambient temperature and the duration of ink storage. However, losses in excess of 20% are not uncommon, and losses of greater than 30% have been reported.

It is known that the instability problem may be avoided by the utilization of untreated pigments. However, this practice has found little or no commercial acceptance inasmuch as such untreated pigments exhibit inferior rheological and coloristic properties. In contradistinction thereto, the present invention provides for diarylide pigments which permit the manufacture of storage stable printing inks previously obtainable only with untreated pigments while maintaining the excellent rheological and coloristic properties associated with amine-treated pigments.

DESCRIPTION OF THE INVENTION

The diarylide pigment compositions of the present invention may be represented by the general formula:

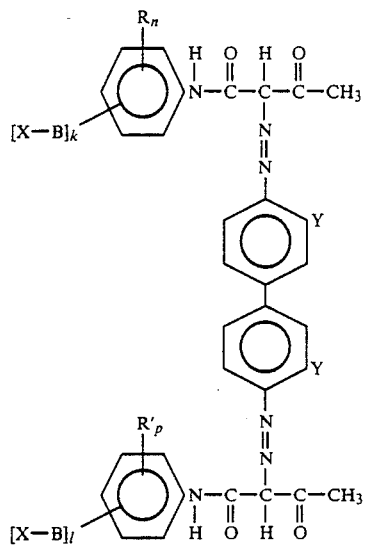

wherein R and R' are independently selected from the group consisting of $C_1$-$C_4$ alkyl, $C_1$-$C_4$ alkoxy, and halogen; n and p are independently integers of 0 to 5; Y is selected from the group consisting of chlorine, methyl or methoxy; B comprises a divalent bridging moiety selected from the group consisting of $C_1$-$C_6$ alkyl, $-NHSO_2-$, $-O-$, $-COO-$ and $-CONH-$; X comprises a poly (alkylene oxide) having a number average molecular weight of about 200 to 10,000; and k and l are independently integers of 0 or 1, with the proviso that for at least 50 wt.% of the pigment composition, k and l are both equal to 0, and for at least 3 wt.% of the pigment composition, k and/or l are equal to 1.

Preferably, k and l are both equal to 0 in respect to 70 to 90 wt.% of the composition; it is also preferred that n and p are both equal to 0, B is the moiety $-CONH-$ and Y is chlorine. It is further preferred that the poly (alkylene oxide) have a number average molecular weight of 1,000 to 3,000.

It is particularly preferred that the poly (alkylene oxide) comprises an ethylene oxide/propylene oxide copolymer, especially a copolymer that is embraced by the general formula:

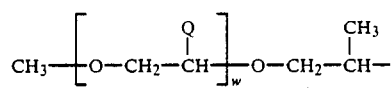

wherein Q is H or CH$_3$ and w is an integer of about 4 to 200, preferably 20 to 65.

The diarylide pigment which comprises 50-97 wt.%, preferably 70 to 90 wt.%, of the composition may be a pigment such as Pigment Yellow 12, Pigment Yellow 13, Pigment Yellow 14, Pigment Yellow 17, Pigment Yellow 83, Pigment Yellow 114, Pigment Yellow 126, Pigment Yellow 127, Pigment Yellow 176 or Pigment Orange 16. Pigment Yellow 12 is most commonly employed for solvent-based publication gravure printing inks.

A preferred diarylide pigment composition for use in preparing a solvent-based publication gravure ink is one in which 50-97 wt.%, preferably 70 to 90 wt.%, of the composition comprises a pigment having the general formula I, with the balance comprising a compound of the general formula II and/or a compound of the general formula III; in this composition, it is preferred that n and p are both equal to 0, Y is chlorine and w is an integer of 20 to 65.

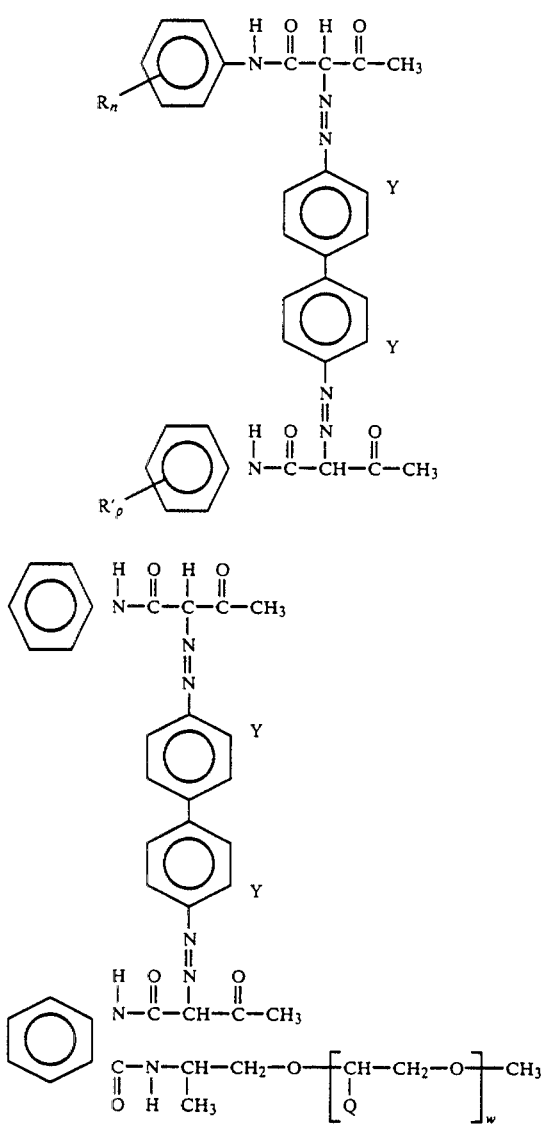

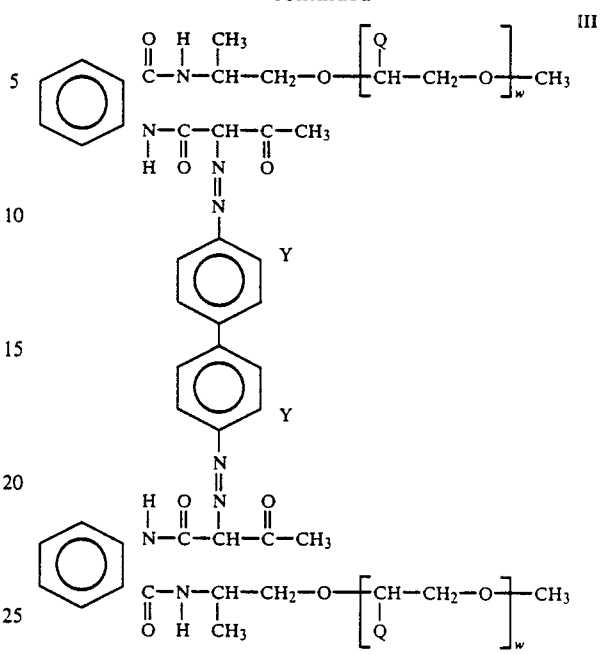

The publication gravure inks of the present invention are prepared in the usual manner known to those skilled in the art. Such inks in their finished form generally comprise 1 to 20 wt. %, preferably 2 to 10 wt.%, pigment composition, 25 to 40 wt.% resin and 50 to 80 wt.% solvent; other typical ingredients such as shading agents, clay, lecithin, etc. may also be present in minor amounts.

Typically, the pigment is premixed with a vehicle comprised of resin and solvent. The resin may be any type used in publication gravure printing inks, such as metal resinates, hydrocarbon resins, phenolic resins and the like; a particularly useful resin is a zinc-calcium resinate. The solvent is most often toluene, but other solvents, including mixtures of aromatics, aliphatics and esters may also be used. Dispersion of the pigment is effected by milling the "pre-mix" to produce a "millbase". The mill base is then diluted with additional vehicle, thereby resulting in a "base-ink" or "virgin ink" which is then diluted with additional solvent to afford a "finished ink" (also termed a "press ready ink").

The process for preparing the diarylide pigment compositions of the present invention involves the mixed coupling of an acetoacetanilide and a poly (alkylene oxide) substituted acetoacetanilide with tetrazotized 3,3'-dichlorobenzidine or dianisidine. The type of acetoacetanilide utilized determines the type of pigment composition which is formed. Preferred acetoacetanilides include acetoacet-m-xylidide; acetoacet-o-toluidide; acetoacet-2,5-dimethoxy-4-chloroanilide; and acetoacet-o-anisidide; especially preferred is acetoacetanilide.

The poly (alkylene oxide) substituted acetoacetanilide employed in the mixed coupling reaction has the general formula:

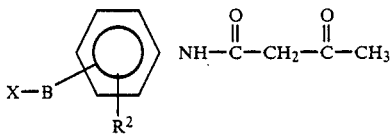

wherein B comprises a divalent bridging moiety selected from the group consisting of $C_1$–$C_6$ alkyl, —NH—, $SO_2$—, —O—, —CO—, —COO—, and —CONH—; X comprises a poly (alkylene oxide) having a number average molecular weight of about 200 to 10,000., $R^2$ comprises 0 to 4 moieties independently selected from the group consisting of $C_1$–$C_4$ alkyl, $C_1$–$C_4$ alkoxy and halogen. Preferably, B is —CONH—, X has a number average molecular weight of 1,000 to 3,000, and $R^2$ is equal to 0 moieties.

Especially preferred are those substituted acetoacet. anilides in which X comprises an ethylene oxide/propylene oxide copolymer having the general formula:

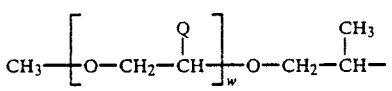

wherein Q is H or $CH_3$ and w is an integer of about 4 to 200, preferably 20 to 65.

The poly (alkylene oxide) substituted acetoacetanilides employed in the mixed coupling reaction leading to the preparation of the diarylide pigment compositions of the present invention in turn are prepared by a two-step process:

Step A: reacting (preferably at a temperature of 20° to 130° C.) a poly (alkylene oxide) monoamine, poly (alkylene oxide) diamine or poly (alkylene oxide) triamine with a reactant comprising isatoic anhydride so as to obtain the respective mono, bis, or tris aminobenzamide-terminated poly (alkylene oxide); and Step B: acetoacetylating the resulting aminobenzamide obtained in Step A with an acetoacetylation agent comprising diketene or t-butylacetoacetate so as to produce the poly (alkylene oxide) substituted acetocetanilide.

The process for preparing a poly (alkylene oxide) substituted acetoacetanilide may be illustrated as follows:

Step A

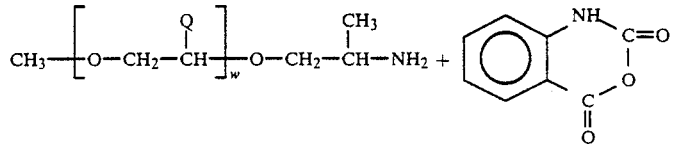

poly (alkylene oxide) monoamine + isatoic anhydride

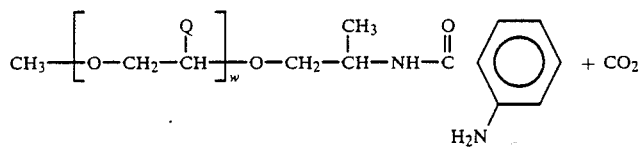

substituted monoaminobenzamide ("K")

Step B

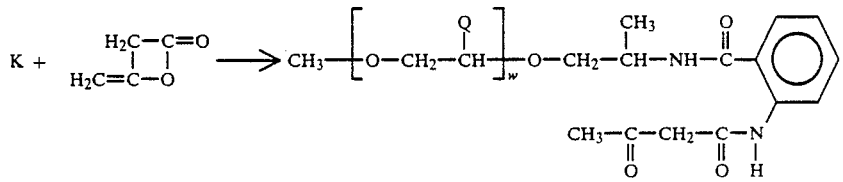

diketene      poly (alkylene oxide) substituted acetoacetanilide ("L")

Acetoacetylation (Step B) may also be performed using t-butylacetoacetate instead of diketene as indicated below. Although the use of t-butylacetoacetate as the acetoacetylation agent leads to the production of t-butanol as a by-product, it is nevertheless preferred for manufactured purposes since diketene is considered hazardous to transport and handle.

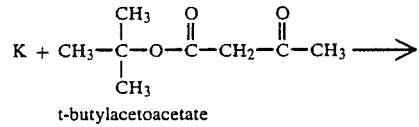

t-butylacetoacetate

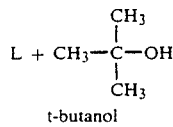

t-butanol

The poly (alkylene oxide) amines employed in Step A are well known and are commercially available, e.g. as Jeffamines ®, manufactured by Texaco Chemical Company. These amines contain a polyether backbone that is based either on propylene oxide, ethylene oxide or mixed propylene oxide and ethylene oxide. The poly (alkylene oxide) monoamines are prepared by reaction of a monohydric alcohol, followed by conversion of the resulting terminal hydroxyl group to an amine. The poly (alkylene oxide) diamines are commercially available as several types, e.g. diamine-terminated polypropylene glycols, polyether diamines based on a predominantly polyethylene oxide backbone as well as urea condensates of such polyether diamines. Useful poly (alkylene oxide) triamines are those prepared by reaction of propylene oxide with a triol, followed by amination of the terminal hydroxyl groups. For the purposes of the present invention, the poly (alkylene oxide) monamines are preferred. Further details of the preparation of poly (alkylene oxide) amines and their properties may be found in the Technical Service Bulletin published by the Texaco Chemical Company, entitled "The Jeffamine ® Polyoxyalkyleneamines".

The following reactions are illustrative of the manner in which the poly (alkylene oxide) substituted acetoacetanilide corresponding to compound "L" may be employed to prepare an improved version of Pigment Yellow 12:

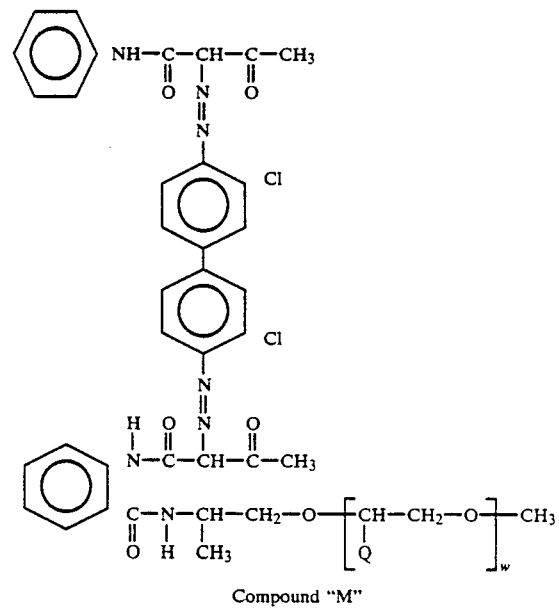

Compound "M"

Pigment Yellow 12

Plus Compound "M" plus Compound "N" shown hereinbelow:

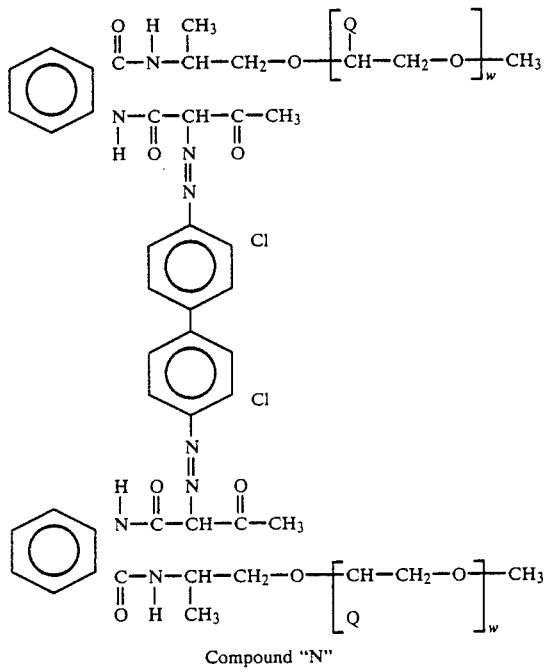

Compound "N"

The diarylide pigment compositions of the present invention are formed in water and are then isolated by filtration to produce a presscake which contains from 20% to 50% pigment. The presscake is then dried and optionally pulverized. The pigment composition may then be converted into a publication gravure printing ink by the general process described above.

Publication gravure inks prepared from the diarylide pigment compositions of the present invention exhibit outstanding storage stability, showing no discernible changes in color shade, strength or rheology, even after prolonged storage at elevated temperatures (over 3 days at 50° C.). Furthermore, the elimination of malodorous amines from the formulations provides an improved manufacturing environment for both the pigment and ink producer.

The following nonlimiting examples serve to illustrate the preparation of the diarylide pigment compositions of the present invention as well as their use in preparing publication gravure printing inks. Unless otherwise indicated, all parts and percentages are by weight.

EXAMPLE I

Agent A: A mixture of 16.5 parts of isatoic anhydride (96% pure) and 220 parts of a primary amine-terminated poly (ethylene oxide/propylene oxide) copolymer having a number average molecular weight of approximately 2,000 (sold as Jeffamine ®M 2070 by Texaco Chemical Corp.) was stirred and heated gradually to 80° C. until evolution of $CO_2$ ceased. The infrared spectrum indicated that the isatoic anhydride had completely reacted as evidenced by the disappearance of the characteristic anhydride absorptions at 1748 $cm^{-1}$ and 1787 $cm^{-1}$ and the appearance on an amide absorption at approximately 1640 $cm^{-1}$. Thereafter, 8.4 parts of diketene were added and stirring continued at 80° C. for about 1 hour until all the diketene had reacted as evidenced by the disappearance of its characteristic infrared absorptions at 1891 $cm^{-1}$ and 1860 $cm^{-1}$. The resulting reddish brown liquid was used in Example II to prepare an improved diarylide pigment composition.

Agent B: The procedure outlined above for the preparation of Agent A was repeated, except that 16.5 parts of t-butyl acetoacetate were substituted for the 8.4 parts of diketene. The reaction mass was then heated, with stirring, at 95° C. for 8 hours. The resulting material possessed an infrared spectrum similar to that of Agent A.

EXAMPLE II

Tetrazotized 3,3'0-dichlorobenzidine ("DCB") was prepared by charging 21.7 parts of DCB to 39.8 parts of 20° Be hydrochloric acid and 140 parts of ice/water mixture with constant stirring to form a homogenous suspension. To the suspension were added 32.6 parts of a 38% solution of sodium nitrite and stirring was continued for 1 hour at a temperature of 0.3° C. The excess nitrous acid was then destroyed by the addition of approximately 0.5 part sulfamic acid.

A fine suspension of coupler was prepared by charging 31.1 parts acetoacetanilide and 0.5 part phenylmethyl pyrazolone (a shading agent) to 400 parts water and 33.6 parts of 50% sodium hydroxide; the mixture was stirred until all solids were dissolved. The temperature of the resulting solution was adjusted to 0°–5° C. with the addition of ice and thereafter the coupler was precipitated by the slow addition of 36.2 parts of 70% acetic acid. Immediately prior to coupling, 20.0 parts of Agent A were added to the coupler suspension. Stirring was maintained throughout coupler preparation and the coupling reaction.

Coupling was then carried out by adding the solution of tetrazotized DCB to the fine suspension of coupler over a period of 40 minutes. Stirring was continued until no excess tetrazotized DCB remained and then the temperature was increased to 40° C. The resulting pigment slurry was stirred an additional 30 minutes, filtered, washed and dried in an oven at 75° C., to afford 69.5 parts of an improved Pigment Yellow 12 composition.

EXAMPLE III

The procedure of Example II was repeated using 20.6 parts of Agent B in place of Agent A. An improved Pigment Yellow 12 composition (yield: 69 parts) similar to that of Example II was obtained.

EXAMPLE IV

This example illustrates the typical preparation of an amine-treated pigment in accordance with the prior art.

Tetrazotized DCB was prepared as in Example I. A fine suspension of coupler was prepared by charging 31.9 parts acetoacetanilide to 400 parts water and 33.6 parts of 50% sodium hydroxide; the mixture was stirred until all solids were dissolved. The temperature of the resulting solution was adjusted to 0°–5° C. with the addition of ice and thereafter the coupler was precipitated by the slow addition of 36.2 parts of 70% acetic acid. Stirring was maintained throughout coupler preparation and the coupling reaction.

Coupling was then carried out by adding the solution of tetrazotized DCB to the fine suspension of coupler over a period of 30 to 40 minutes. While the coupling reaction was taking place, an emulsion was prepared by adding 8.1 parts of N-tallow alkyldipropylene triamine (a typical amine for treating pigments in accordance with the prior art) to an agitated solution of 4.5 parts 70% acetic acid in 39.2 parts water. At the completion of the coupling reaction (no excess tetrazo remained), the emulsion was added to the resulting pigment slurry over a period of 15 minutes. The slurry was heated to a temperature of 95° C. and the pH was then adjusted from 4.0–4.2 to 11.0–11.2 with approximately 19.0 parts of 50% sodium hydroxide. Stirring at 95° C. was continued for 15 minutes and the slurry was then diluted with cold water, filtered, washed and dried in an oven at 110° C., to afford 61.4 parts of an amine-modified Pigment Yellow 12 composition which is representative of the amine-treated pigments of the prior art.

EXAMPLE V

Publication gravure printing inks were prepared from the pigment compositions of Examples III and IV. Thus, 25 parts of each pigment composition were mixed with 75 parts of a commercial publication gravure ink vehicle comprised of 56.4 parts of toluene and 18.6 parts of a zinc-calcium resinate, and milled for 30 minutes using 300 parts of ⅛ inch stainless steel shot as the grinding media. The viscosity of the mill base prepared from the pigment composition of Example III was approximately one-fourth of that of the mill base prepared from the pigment composition of Example IV (the prior art pigment composition).

Base inks containing 5% pigment were then prepared by dilution of the mill bases with 63.8 parts of vehicle and 20.2 parts of toluene. One-half of each base ink was sealed and stored at 50° C. for 72 hours in order to assess storage stability. The other half of each base ink was immediately adjusted to print viscosity (18±2 seconds through a no. 2 shell cup) with the addition of toluene and printed to assess coloristic properties. The results indicated that the two inks required the same amount of diluent to achieve the desired print viscosity and produced prints with comparable strength, shade, transparency, gloss and hold-out. Thus, it appears that, apart from storage stability, the ink prepared from the pigment composition of Example III exhibited comparable application properties as compared to the conventional ink prepared from the prior art pigment composition of Example IV.

The base inks which were maintained at 50° C. for 72 hours were cooled to ambient temperature and then converted to finished inks with addition of toluene as described above. Evaluation of the inks indicated that the ink prepared from the prior art pigment composition of Example IV was 40% weaker, more opaque, flatter and greener in shade than that prepared from the pigment composition of Example III. Furthermore, the ink base prepared from the prior art pigment composition of Example IV required approximately 50% more diluent to achieve print viscosity.

As may be seen from the examples set forth above, the diarylide pigment compositions of the present invention can be conveniently prepared and exhibit significantly improved properties, particularly in providing lower rheology mill bases and finished publication gravure printing inks possessing dramatically improved storage stability.

What is claimed is:

1. A diarylide pigment composition comprising:

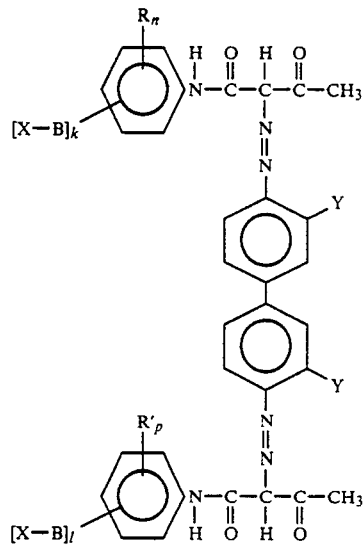

wherein R and R' are independently selected from the group consisting of $C_1$-$C_4$ alkyl, $C_1$-$C_4$ alkoxy, and halogen; n and p are independently integers of 0 to 5; Y is selected from the group consisting of chlorine, methyl or methoxy; B comprises a divalent bridging moiety selected from the group consisting of $C_1$-$C_6$ alkyl, —$NHSO_2$—, —O—, —CO—, —COO— and —CONH—; X comprises a poly (alkylene oxide) having a number average molecular weight of about 200 to 10,000; and k and l are independently integers of 0 or 1, with the proviso that for at least 50 wt.% of the pigment composition, k and l are both equal to 0, and for at least 3 wt.% of the pigment composition, k and/or l are equal to 1.

2. The composition of claim 1 wherein k and l are both equal to 0 in respect to 70 to 90 wt.% of the composition.

3. The composition of claim 1 wherein B is —CONH—.

4. The composition of claim 1 wherein Y is chlorine.

5. The composition of claim 1 wherein the poly (alkylene oxide) has a number average molecular weight of 1,000 to 3,000.

6. The composition of claim 1 wherein the poly (alkylene oxide) comprises an ethylene oxide/propylene oxide copolymer.

7. The composition of claim 6 wherein the copolymer has the general formula:

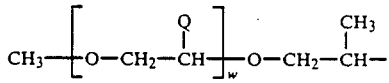

wherein Q is H or $CH_3$ and w is an integer of about 4 to 200.

8. The composition of claim 7 wherein w is an integer of 20 to 65.

9. The composition of claim 1 wherein n and p are both equal to 0.

10. The composition of claim 1 wherein 50.97 wt.% of the composition comprises a pigment selected from the group consisting of Pigment Yellow 12, Pigment Yellow 13, Pigment Yellow 14, Pigment Yellow 17, Pigment Yellow 83, Pigment Yellow 114, Pigment Yellow 126, Pigment Yellow 127, Pigment Yellow 176 and Pigment Orange 16.

11. A publication gravure ink comprising the pigment composition of claim 1, a resin and a solvent.

12. The ink of claim 11 wherein the resin comprises a zinc-calcium resinate.

13. The ink of claim 11 wherein the solvent comprises toluene.

14. The ink of claim 11 wherein the pigment composition is present in an amount of 1 to 20 wt.%.

15. The diarylide pigment composition comprising 50-97 wt.% of a pigment having the general formula I, with the balance of the composition comprising a compound of the general formula II and/or a compound of the general formula III:

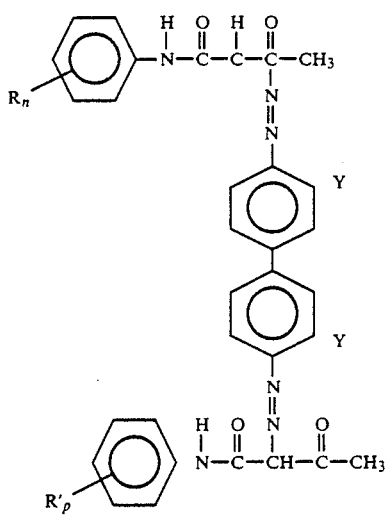

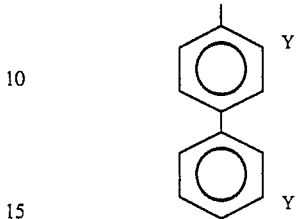

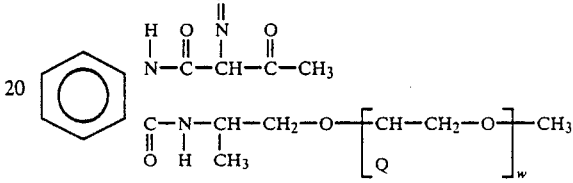

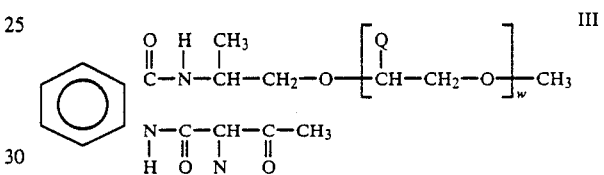

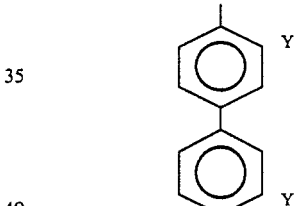

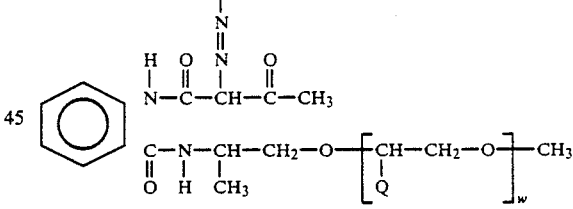

wherein R and R' are independently selected from the group consisting of $C_1$-$C_4$ alkyl, $C_1$-$C_4$ alkoxy, and halogen; n and p are independently integers of 0 to 5; Y is selected from the group consisting of chlorine, methyl or methoxy; Q is H or $CH_3$; and w is an integer of about 4 to 200.

16. The pigment composition of claim 15 wherein w is an integer of 20 to 65.

17. The pigment composition of claim 15 wherein the pigment having the general formula I is present in an amount of 70 to 90 wt. %.

18. The pigment composition of claim 15 wherein n and p are both equal to 0.

19. The pigment composition of claim 15 wherein Y is chlorine.

* * * * *